United States Patent
Theissen (10) Patent No.: US 11,988,752 B2
(45) Date of Patent: May 21, 2024

(54) METHOD OF ANALYZING A GROUND-BASED AUGMENTATION SYSTEM SIGNAL AND TEST SYSTEM FOR TESTING A GROUND-BASED AUGMENTATION SYSTEM

(71) Applicant: Rohde & Schwarz GmbH & Co. KG, Munich (DE)

(72) Inventor: Klaus Theissen, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 217 days.

(21) Appl. No.: 16/917,357

(22) Filed: Jun. 30, 2020

(65) Prior Publication Data
US 2021/0241640 A1 Aug. 5, 2021

(30) Foreign Application Priority Data

Jan. 30, 2020 (DE) ........................ 102020102290.5
Jan. 31, 2020 (DE) ........................ 102020102538.6

(51) Int. Cl.
*G01S 19/07* (2010.01)
*G01S 19/24* (2010.01)
*G01S 19/25* (2010.01)
*G01S 19/34* (2010.01)
*G06F 18/214* (2023.01)
(Continued)

(52) U.S. Cl.
CPC .......... *G01S 19/071* (2019.08); *G01S 19/074* (2019.08); *G01S 19/243* (2013.01); *G01S 19/252* (2013.01); *G01S 19/34* (2013.01); *G08G 5/0013* (2013.01); *G08G 5/025* (2013.01); *G06F 18/214* (2023.01)

(58) Field of Classification Search
CPC .... G01S 19/074; G01S 19/243; G01S 19/252; G01S 19/34; G08G 5/025; G08G 5/0013; G06K 9/6256
See application file for complete search history.

(56) References Cited

U.S. PATENT DOCUMENTS

| 10,473,791 B1 | 11/2019 | Wang et al. |
| 2019/0187295 A1 | 6/2019 | Lee et al. |
| 2019/0215143 A1 | 7/2019 | Lin et al. |

FOREIGN PATENT DOCUMENTS

| CN | 107390237 A | * | 11/2017 | ............. G01S 19/12 |
| CN | 106873001 B | * | 3/2018 | ............. G01S 19/12 |
| EP | 2913691 A1 | | 9/2015 | |

(Continued)

OTHER PUBLICATIONS

T. Murphy et al., Implementation and Operational Use of Ground-Based Augmentation Systems (GBASs)—A Component of the Future Air Traffic Management System, Proceedings of the IEEE, vol. 96, No. 12, p. 1936-1957, Dec. 2008 (Year: 2008).*

(Continued)

Primary Examiner — Bernarr E Gregory
Assistant Examiner — Fred H Mull
(74) Attorney, Agent, or Firm — CHRISTENSEN O'CONNOR JOHNSON KINDNESS PLLC (57) ABSTRACT

A method of analyzing a ground-based augmentation system (GBAS) signal, comprising: transmitting at least one GBAS message burst; receiving the GBAS message burst, and performing a power measurement at symbol times of the GBAS message burst. Further, a test system for testing a ground-based augmentation system is described.

10 Claims, 8 Drawing Sheets

(51) Int. Cl.
  *G08G 5/00* (2006.01)
  *G08G 5/02* (2006.01)

(56) References Cited

FOREIGN PATENT DOCUMENTS

| | | | |
|---|---|---|---|
| JP | 2003078452 A | * | 3/2003 |
| JP | 201355266 A | | 12/2013 |
| WO | 2004029648 A1 | | 4/2004 |
| WO | 2018144643 A1 | | 8/2018 |

OTHER PUBLICATIONS

International Civil Aviation Organization, Guide for Ground Based Augmentation System Implementation, p. 1-31, https://www.icao.int/SAM/eDocumentsrestore/GBASGuide.pdf, May 2013 (Year: 2013).*
Portable. (2016). American Heritage Dictionary of the English Language (6th ed.). Houghton Mifflin. Credo Reference: https://search.credoreference.com/content/entry/hmdictenglang/portable/0 (Year: 2016).*
Burst. (2001). Hargrave's Communications Dictionary. Wiley. Credo Reference: https://search.credoreference.com/content/entry/hargravecomms/burst/0 (Year: 2001).*
M. Stanisak et al., Multiple Satellite Navigation Systems for the Ground Based Augmentation System, Proceedings of the 2014 International Technical Meeting of The Institute of Navigation, p. 254-264 (Year: 2014).*

* cited by examiner

Example for Slot B:

Expectation: Av == Pk

Fig. 8

Example for Slot A:

Fig. 9

Slot B:

METHOD OF ANALYZING A GROUND-BASED AUGMENTATION SYSTEM SIGNAL AND TEST SYSTEM FOR TESTING A GROUND-BASED AUGMENTATION SYSTEM

FIELD OF THE DISCLOSURE

The present disclosure generally relates to a method of analyzing a ground-based augmentation system signal. Further, the present disclosure generally relates to a test system for testing a ground-based augmentation system.

BACKGROUND

A Ground Based Augmentation System (GBAS) is based on a Differential Global Navigation Satellite System (DGNSS) to ensure the required performance in the determination of position coordinates for precision approaches of aircrafts, namely accuracy, integrity, continuity, and availability.

This is necessary since the Global Navigation Satellite Systems (GNSS) have a limited specified precision, which might be not sufficient for precision landing approaches at airports under certain circumstances. For instance, a Global Positioning System (GPS) has a precision in the range of 9 to 17 meters. The other systems known, such as GLONASS, Galileo or BeiDou, also have a precision that might be not sufficient.

In addition, errors in the respective system are only insufficiently detected by the respective system itself or with a delay of several hours, which is not acceptable.

Typically, the GBAS comprises GNSS satellites, a GBAS ground station, and GBAS receivers on board of the approaching aircraft. The GBAS ground station is usually assigned to several GNSS reference receivers connected with several GNSS reference antennas, which are located at precisely measured positions on an airfield. Typically, two to four GNSS reference receivers are provided. A respective GNSS signal from a GNSS satellite is received by the GNSS reference receivers connected to these GNSS reference antennas, wherein deviations of the received position from the actual position of the GNSS reference antenna are determined for each individual GNSS satellite. These deviations determined are transmitted to the aircraft twice per second via a digital data link, for instance a VHF Data Broadcast (VDB) that uses the Very High Frequency (VHF) band. This data link operates in the protected flight frequency range between 108 and 118 MHz using the time-division multiplex method. Accordingly, several GBAS ground stations are enabled to operate on a single frequency. In fact, correction data is transmitted via the VDB, particularly in the frequency range of 108.025 MHz to 117.95 MHz, to the receiver of the approaching aircraft to correct its GNSS signal received from the respective GNSS satellites.

In addition to the correction data, data of the GBAS ground station and components related thereto, for instance position, equipment, performance, and data of the approach routes permitted for the airfield are transmitted to the aircraft in separate messages at least every 10 seconds.

The aircraft having a GNSS receiver uses the correction data received from the GBAS ground station in order to determine the actual position of the aircraft with an accuracy of less than one meter. Therefore, the precision is improved. The position determined is compared with the respective approach path of the GBAS ground station selected by the pilot and corrected if necessary.

Thus, the Ground Based Augmentation System (GBAS) relates to an assisting system that ensures a higher precision.

Accordingly, the GBAS system delivers differential GNSS correction data in real time to enable precision approach and landing for the respective aircraft. The GBAS ground station uses the data from the GNSS reference receivers located around the airport to create the correction data transmitted.

Typically, the data transmitted by means of the VDB link uses a so-called Differential 8-Phase Shift Keying (D8PSK) modulation relating to a differential modulation format in which the bits for a given symbol are determined by the phase change from the previous symbol.

Moreover, the data is transmitted in bursts with eight timeslots each. Each slot carries application data, which can belong to one or more message types (MT). The application data may correspond to the correction data, the data of the GBAS ground station and/or the data of the approach routes permitted for the airfield.

GBAS must fulfill the most stringent safety requirements. Therefore, the International Civil Aviation Organization (ICAO) has standardized critical GBAS parameters to ensure precise operation and worldwide compatibility of GBAS. Service providers and flight inspection organizations regularly monitor, check, calibrate and certify GBAS systems to ensure conformance with the specification. These activities call for robust and reliable test equipment that meets all relevant requirements, from calibration to installation and maintenance in the lab and in the field.

SUMMARY

Accordingly, there is a need for a fast and reliable method for testing a ground-based augmentation system.

The present disclosure provides examples of a method of analyzing a ground-based augmentation system (GBAS) signal. In an embodiment, the method comprises the following steps:

transmitting at least one GBAS message burst;
receiving the GBAS message burst; and
performing a power measurement at symbol times of the GBAS message burst.

Further, the present disclosure provides examples of a test system for testing a ground-based augmentation system (GBAS). In an embodiment, the test system comprises a GBAS transmitter, a GBAS test receiver and a control and/or evaluation circuit or module. The GBAS test transmitter is configured to transmit a GBAS message burst. The GBAS test receiver is configured to receive the GBAS message burst. The control and/or evaluation module is configured to perform a power measurement at symbol times of the GBAS message burst.

Accordingly, the power of the GBAS message burst is measured over the symbol times that occur. The power measurement may be performed at all symbol times of the at least one GBAS message burst. In some embodiments, the power measurement is performed only at all symbol times. Generally, it is ensured that any occurring deviations or fluctuations in the power during the GBAS message burst are taken in consideration, as the power measurement is performed over a relatively long duration compared to the prior art, in which power measurements are typically only performed at a so-called training sequence at the beginning of the respective GBAS message burst. However, power deviations/fluctuations, which occur later than the training sequence, are disregarded for determining the power, yielding in inaccurate measurement results.

According to an aspect, the power measurement is performed over the entire length of the GBAS message burst. This ensures that all occurring symbol times within the GBAS message burst are taken into consideration for performing the respective power measurement. Hence, all deviations or fluctuations are considered appropriately.

According to another aspect, the GBAS message burst encompasses a training sequence and application data following the training sequence in time. At the beginning of the GBAS message burst, symbols are transmitted in the training sequence that is assigned to an 88-bit period. The training sequence is followed by the application data that may encompass up to 1,776 bits (222 8-bit words).

Moreover, the GBAS message burst may comprise an end portion that follows the application data. This end portion may be assigned to a 59-bit period that encompasses forward error correction (FEC), fill bits and a ramp down.

In addition, the GBAS message burst may be assigned to a Very High Frequency Data Broadcast signal. The Very High Frequency (VHF) Data Broadcast signal is also called VDB signal. In general, the correction data, the data of the GBAS ground station and/or the data of the approach routes permitted for the airfield may be transmitted by the VDB signal.

Another aspect provides that a GBAS signal is transmitted that comprises the at least one GBAS message burst, and wherein the GBAS signal is received and decoded. The decoding ensures that the respective symbols (and their symbol times) can be obtained.

In some embodiments, the GBAS signal comprises several frames, wherein each frame is assigned to eight time slots, and wherein the at least one GBAS message burst transmitted is transmitted within one of these time slots. The GBAS message burst may be transmitted after a first guard interval within the respective time slot. In addition, a second guard interval may follow the GBAS message burst within the respective time slot. In other words, the GBAS message burst may be interposed between two different guard intervals assigned to the beginning and the end of each time slot. The first guard interval may have a duration of 95.2 μs, whereas the second guard interval may have a duration of 1357.2 μs.

Moreover, each frame of the GBAS signal may have a duration of 500 ms such that two frames are transmitted per second. Further, each frame has eight time slots to be allocated. Thus, each time slot has a duration of 62.5 ms. The at least one GBAS message burst is transmitted during one of these time slots, wherein the guard intervals are provided at the beginning and the end of the time slot, respectively. Hence, the GBAS message burst has a duration shorter than the duration of the time slot of 62.5 ms. In some embodiments, the duration of the time slot may be up to 61 ms provided that the application data comprises all available bits, namely 1,776 bits.

According to a certain embodiment, the control and/or evaluation module and the GBAS test receiver are commonly integrated in a testing device. The testing device is used to verify the GBAS signal transmitted by the GBAS transmitter. In general, the testing device relates to a signal level and modulation analyzer that may be specifically designed for a ground station or installation in flight inspection aircraft.

For instance, the testing device is a handheld device or a portable device, for example a battery-powered testing device. Hence, a certain flexibility is ensured.

Furthermore, the GBAS test transmitter may be established by a GBAS transmitter of the ground-based augmentation system to be tested. Thus, the receiving function of the ground-based augmentation system can be verified/analyzed.

Moreover, the GBAS test receiver may be established by a GBAS receiver of an airplane of the ground-based augmentation system to be tested. Thus, the transmitting function of the ground-based augmentation system can be verified/analyzed.

In general, the GBAS signal may encompass data, namely the (binary) application data, which is encoded using a differentially encoded eight-phase-shift-keying (D8PSK) modulation and a symbol rate of 10,500 symbols per second. With three bits transmitted per symbol, up to 31,500 bits per second may be transmitted. Accordingly, each time slot can contain up to 222 bytes (1,776 bits) of binary application data.

Generally, the GBAS (test) transmitter may ramp up to 90% of the steady state measured output power level in a time less than 190.5 μs (two symbols) after the beginning of the respective GBAS message burst.

Moreover, the GBAS (test) transmitter may stabilize above 90% of the steady state measured output power level within 476.2 μs (five symbols) after the beginning of the respective GBAS message burst.

In some embodiments, the GBAS (test) transmitter power stabilization segment may consist of five symbols each representing 000, namely two symbols for the radio frequency (RF) power rise time and three symbols for the receiver automatic gain control (AGC) stabilization.

However, the further symbol times provided in the GBAS message burst are also taken into consideration for performing the respective power measurement.

Generally, each GBAS message burst within the GBAS signal is measured with regard to its power or taken into consideration for the respective power measurement.

Accordingly, power fluctuations during the GBAS message burst are eliminated, resulting in much better reproducibility.

In general, the power measurement results do not depend on the message content, as the respective power measurement is only performed during the symbol times.

Furthermore, this ensures that each GBAS message burst can be measured without performing an averaging that reduces the performance.

Current VDB measurement method (state of the art) The standardized method for VDB field strength (power) measurements is to average over the 48 synchronization and ambiguity resolution bits of the training sequence on all available samples (16 symbols/48 bit=1.5238 ms). In former times, this 48 bit sequence at the beginning of each burst was the only part with a fixed content (ED-114B, 3.6.2.3.8.2) and 100% nominal percentage of the steady-state power.

The total VDB field strength measurement uncertainty is ±3 dB including antenna, cabling, connector, splitter, receiver, etc.

However, the current VDB measurement method, for example the level measurement method, has the followings disadvantages.

The trainings sequence is short and a disturbance or a wrong antenna correction factor at a certain antenna angle can lead to wrong GBAS burst level indications.

Dynamic GBAS measurements, for instance for a vehicle or plane, require a very accurate knowledge of the antenna characteristics at the time of the measurement, namely about 1.5 ms.

Changes of the GBAS power during a burst are (more or less) not taken into account. Hence, the burst power differs significantly from the indicated value.

New VDB Measurement Method According to the Disclosure

The respective measurements of the VDB measurement method according to the disclosure are only performed at the symbol times (length of pointer==1), but over the complete length of the burst.

For verification purposes, the situation can be simplified by only looking at bursts that are filled completely. The minimum required burst length for GAST D (GBAS Approach Service Type D) is in fact not 100%, but only 89%. However, this can be easily adapted and does not affect the principals of this method since the results stay valid.

Moreover, the level measurement method according to the disclosure can also be made available for GAST C (GBAS Approach Service Type C) installations not supporting VDB authentication. In some embodiments, the length of the burst can be read from the GBAS header and the measurement can be limited to the number of transmitted symbols.

Hereinafter, a method according to an embodiment of the disclosure is described in more detail.

A GBAS, namely a ground-based augmentation system, is used in a normal operation mode or a respective test mode. However, the test mode is not required. Then, the respective power measurement is only on the symbol times of the GBAS message burst, for instance a message modulated according to Differential 8-Phase Shift Keying (D8PSK), resulting in amplitude normalized on symbol times.

The power measurement may be performed over the complete length of the GBAS message burst, for example all messages in one time slot.

The advantages mentioned hereinafter are obtained by the methods of the disclosure.

The effect of e.g. antenna notches is reduced. In some embodiments, the effect may be limited because even averaging over a full length burst (with a certain number of symbols, e.g. 633) would be an averaging over 0.0609 s and with a typical speed of an aircraft in the final phase of an approach of 70 m/s this would equal to 4.22 m. This is less than 2 times a typical VDB wavelength.

Moreover, the results obtained are independent on message content. Hence, the measurements can be done during the time the burst has its full power. In some embodiments, the power measurement can be done over the entire length of the GBAS message burst except ramp up and ramp down times.

As already mentioned above, the reproducibility is increased.

Since the power measurement is spread over a longer time period, a better reproducibility of the respective power measurement is ensured.

Further, more measurement values may be gathered compared to the standard procedures since up to 633 symbols can be taken into account in contradiction to 16 symbols in the past.

In general, the power measurements at the symbol times of the complete GBAS message burst (up to 633 symbols: 48+3+17+5+1776+48+2 bits) represent much more the real GBAS burst power than the classical power measurements at the symbol times of a trainings sequence (16 symbols) does if the GBAS power changes during the message burst.

So far, the principle of the method was tested with synthetic VDB signals and used to average over the whole part of a respective GBAS message burst in which the transmitted power is at 100% nominal steady-state level.

However, this method can be applied to shorter parts of a GBAS message burst as well to provide more VDB power measurement values per time slot. For comparison reasons, a good starting point may be to average over 48 bits equal to the method used so far.

However, this principle could be applied to other parts of a burst as well without being impacted by the varying message content. In case of a fully occupied burst of 633 symbols and averaging over all 48 bits pieces, a maximum of 39 measurement values could be gained per slot.

After these first tests with synthetic signals from a signal generator in a controlled environment, namely lab conditions, the robustness of the method was also tested under more advanced conditions. In some embodiments, the method was tested by tests with VDB signals from a signal generator, tests with a recorded VDB signal (IQ data) from the output of a real transmitter, tests with multi VDB signals recorded at a static position at a real airport (very limited power variations in each slot, very limited changes in multipath environment, typically no significant VDB RFI), tests with multi VDB signals recorded during test drives at a real airport, and tests with multi VDB signals recorded during test drives at a real airport and close to other VDB and/or VHF interference sources at adjacent channels.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
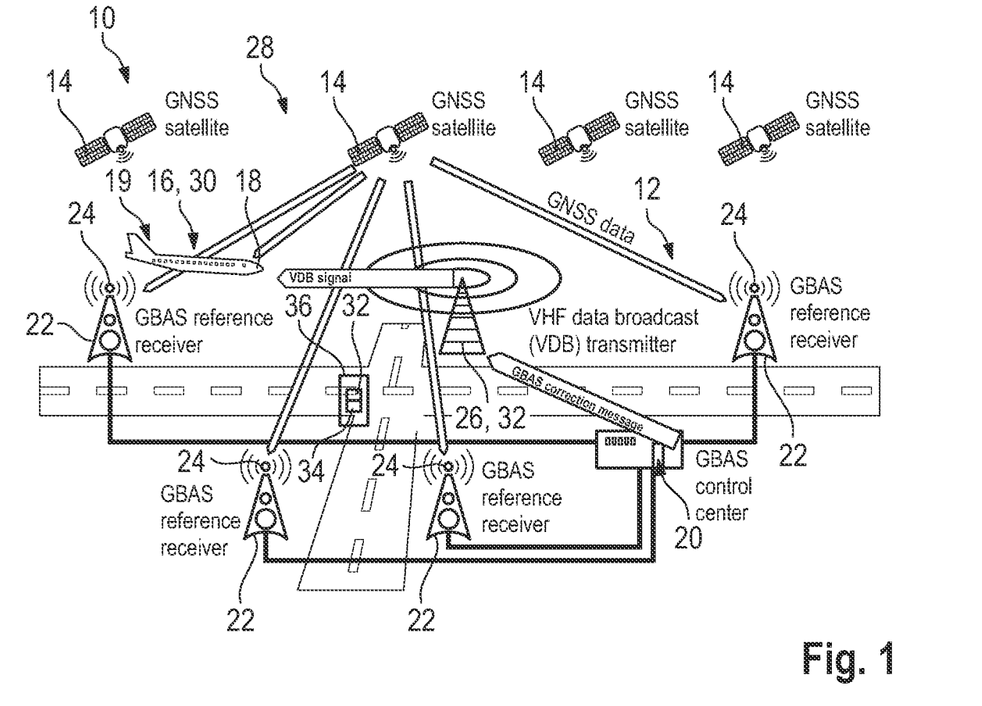
FIG. 1 shows a schematic overview of a ground-based augmentation system and a test system according to an embodiment.

In FIG. 1, a ground-based augmentation system 10 is shown that is abbreviated by GBAS. The GBAS 10 comprises a GBAS ground subsystem 12, several GNSS satellites 14 and at least one GBAS receiver 16 on board of an approaching aircraft 18. The aircraft 18 also has a GNSS receiver 19.

The GBAS ground subsystem 12 comprises a GBAS ground station 20, several GNSS reference receivers 22 connected with several GNSS reference antennas 24. In the shown embodiment, four GNSS reference receivers 22 are shown. The GBAS ground station 20 comprises a GBAS transmitter 26, namely a VHF data broadcast (VDB) transmitter, which is configured to establish a VHF data link (VDL) with the aircraft 18 by a GBAS signal, also called VDB signal.

Generally, the GBAS 10 operates as described hereinafter.

The GNSS satellites 14 transmit respective GNSS signals that are received by the GNSS reference antennas 24, which are connected with the corresponding GNSS reference receivers 22. Then, deviations of the received position, namely the one according to the GNSS signal, from the actual position of the GNSS reference antenna 24, namely the true ones, are determined for each individual GNSS satellite 14.

The GBAS ground station 20 may perform the respective calculations, which is connected with the GNSS reference receivers 22 by respective lines so as to receive the signals received.

The deviations determined are used to calculate correction data associated with the deviations. The correction data is transmitted to the aircraft 18 twice per second via a digital data link, namely a VHF Data Broadcast (VDB) that uses the Very High Frequency (VHF) band. Therefore, the GBAS ground station 20 communicates with the GBAS transmitter 26 that establishes the VHF Data Link (VHL) with the aircraft 18, for example the GBAS receiver 16 on board.

Furthermore, data of the GBAS ground subsystem 12, for instance position, equipment, performance, and data of the approach routes permitted for the airfield are transmitted to the aircraft in separate messages at least every 10 seconds.

The aircraft 18 with the GNSS receiver 19 on board uses the correction data received from the GBAS ground station 20 in order to determine the actual position of the aircraft 18 with an accuracy of less than one meter.

For analyzing or rather verifying the VHF Data Link between the GBAS ground subsystem 12 and the aircraft 18, a test system 28 is provided that comprises a GBAS test transmitter 30, a GBAS test receiver 32 and a control and/or evaluation circuit, such as module 34.

The GBAS test receiver 32 and the control and/or evaluation module 34 are integrated in a testing device 36, which may be a handheld device or a portable device, for example a battery-powered testing device.

The GBAS test transmitter 30 of the test system 28 may relate to the GBAS transmitter 26 of the GBAS ground subsystem 12. Accordingly, the GBAS test transmitter 30 and the GBAS transmitter 26 may be the same.

In an alternative embodiment, the GBAS test receiver 32 is established by the GBAS receiver 16 on board of the aircraft 18.

In general, the GBAS test transmitter 30 is configured to transmit a GBAS signal, which is received by the GBAS test receiver 32. The GBAS signal received is evaluated by the control and/or evaluation module 34 that performs power measurements.

Figure 3:
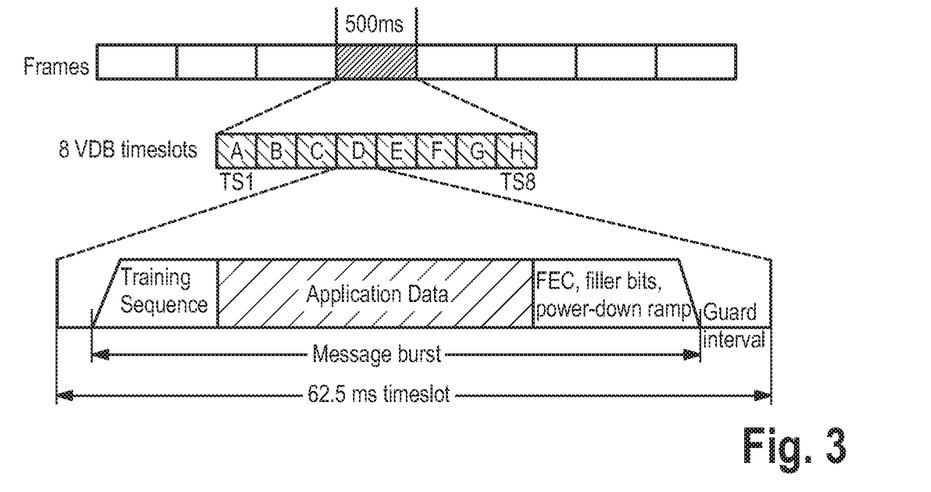
FIG. 3 shows an overview of a VDB data timing structure.

In general, the GBAS signal comprises at least one GBAS message burst as shown in FIG. 3. The GBAS message burst encompasses a training sequence and application data that follows the training sequence in time. Thus, several symbols are transmitted at the beginning of the GBAS message burst, namely within the training sequence that is assigned to an 88-bit period. The training sequence is followed by the application data that may encompass up to 1,776 bits (222 8-bit words). Moreover, the GBAS message burst comprises an end portion that follows the application data. This end portion is assigned to a 59-bit period that encompasses forward error correction (FEC), fill bits and a ramp down.

The GBAS message burst is transmitted within one of several time slots, wherein the GBAS message burst is interposed between two different guard intervals, namely a first one and a second one, that are assigned to the beginning and the end of the respective time slot. The first guard interval has duration of 95.2 µs, whereas the second guard interval has a duration of 1357.2 µs.

FIG. 3 further shows that eight time slots are assigned to a single frame having a duration of 500 ms, wherein several frames are assigned to the GBAS signal.

Figure 4:
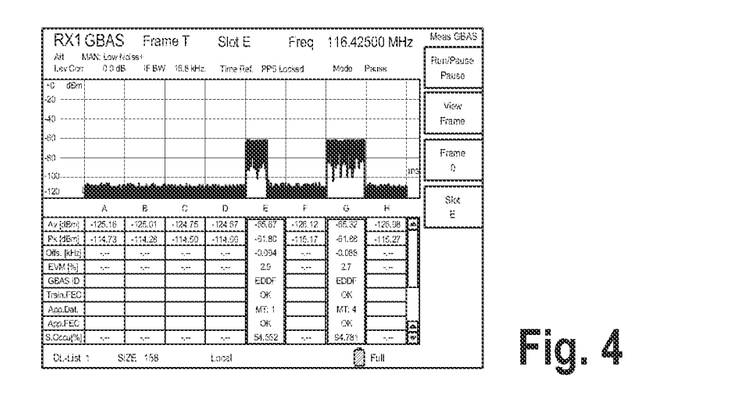
FIG. 4 shows a diagram of a time domain analysis of a GBAS frame of a GBAS signal.

In FIG. 4, a single frame comprising the eight time slots is shown in detail, which might comprise a respective GBAS message burst. As shown in FIG. 4, only the fifth and the seventh time slot comprise a respective GBAS message burst, which are labeled with "E" and "G".

Figure 5:
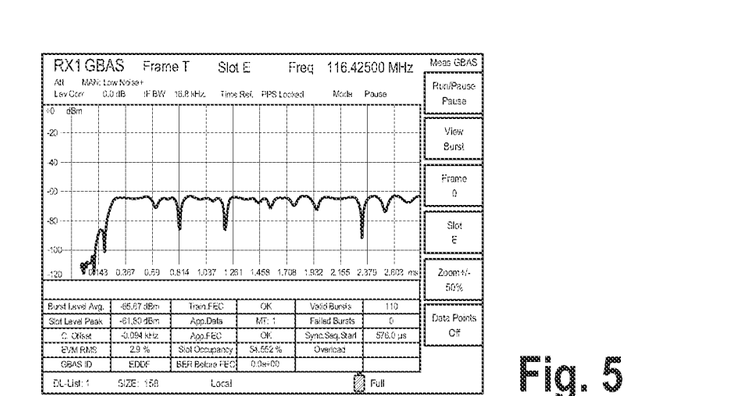
FIG. 5 shows a diagram of a portion of a GBAS message burst of the GBAS signal.
Figure 6:
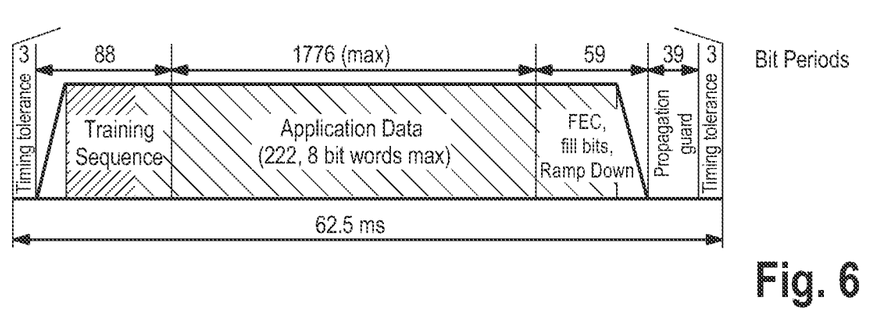
FIG. 6 shows another diagram of a time domain analysis of a GBAS frame of a GBAS signal.
Figure 7:
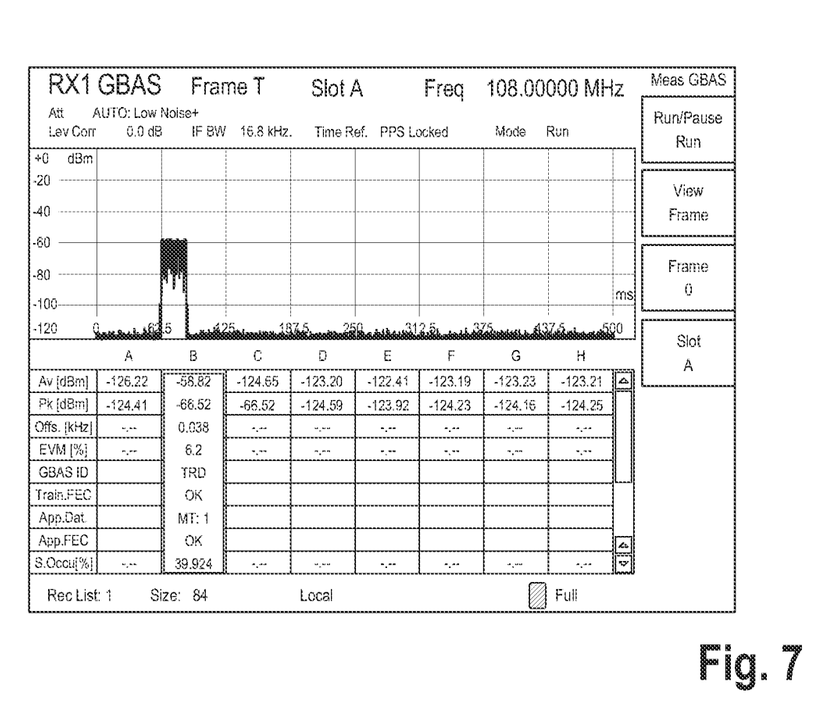
FIGS. 7-16 illustrate several steps of verifying the method according to an embodiment.

In FIG. 5, a respective portion of one of the GBAS message bursts is shown in detail. It becomes obvious that the respective power varies over time. Put differently, power fluctuations occur.

In general, the GBAS message burst encompassed in the GBAS signal is assigned to a Very High Frequency Data Broadcast signal. Hence, the correction data, the data of the GBAS ground subsystem 12 and/or the data of the approach routes permitted for the airfield can be transmitted by the GBAS signal, also called VDB signal.

Figure 2:
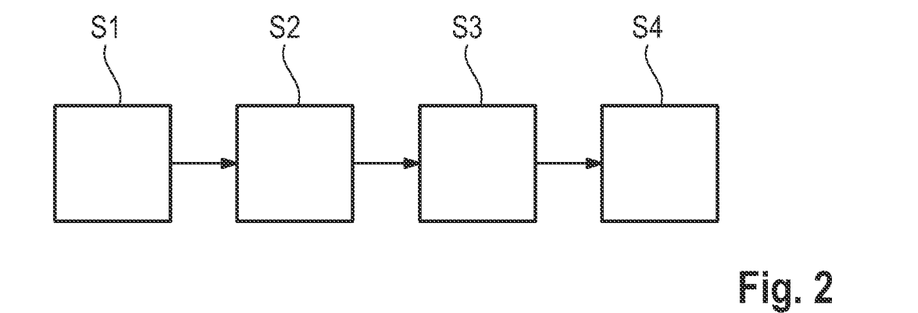
FIG. 2 shows a flow-chart of a method of analyzing a ground-based augmentation system (GBAS) signal according to an embodiment.

In FIG. 2, a flow-chart is shown that illustrates a method of analyzing the ground-based augmentation system (GBAS) signal described above.

In a first step S1, the GBAS signal is transmitted, which comprises the at least one GBAS message burst. In a second step S2, the GBAS signal is received. In a third step S3, the GBAS signal received is decoded such that the respective symbols (and their symbol times) are obtained from the GBAS signal, for example the at least one GBAS message burst.

In a fourth step S4, a power measurement at the symbol times of the GBAS message burst is performed. The symbols or rather their symbol times may trigger the respective power measurement performed by the control and/or evaluation module 34.

The method according to an embodiment of the disclosure has been verified as described hereinafter with reference to FIGS. 6-14.

For test purposes, a beta version of a GBAS VDB option of the test system was used. Generally, the respective GBAS VDB option offers two different values for measurement of the power of the GBAS message burst, namely:

Power at the symbol times of the trainings sequence (synchronization and ambiguity resolution) on all available samples (16 symbols), which relate to Av[dBm];

Power at the symbol times of the complete burst (max. 633 symbols: 48+3+17+5+1776+48+2 bits), which relate to Pk[dBm].

Referring to FIGS. 7-16, a plausibility check performed is described, i.e. a test whether the indication of the test system fits to the expectations. For the plausibility check, a partly filled burst was used, wherein the expected power of the GBAS message burst was calculated.

The transmission length of the GBAS message burst corresponds to 712 bit, wherein the number of symbols was 262, namely (712+48+3+17+5+1 fill bit) divided by 3. The maximum number of symbols (incl. App FEC) is 633, namely 1824+48+3+17+5+2 fill bits) divided by 3.

Accordingly, the expected difference between the indicated values (Pk-Av) due to the partly filled burst corresponds theoretically to 20*lg (262/633)=−7.66 dB.

The power measurement performed by the test system, having a signal generator creating this partly filled burst, indicate that the measured power level difference is −7.7 dB, namely Pk−Av=−66.52 dBm+58.82 dBm=−7.7 dB.

This demonstrates that principally the new Pk value obtained by performing the method according to embodiments of the disclosure shows the expected reduced signal level.

Hereinafter, synthetic test scenarios/test cases are described below.

With the help of synthetic signals, four different GBAS scenarios are created. The results show the differences of the respective power measurement methods.

In a first GBAS scenario, burst level differences between slots are determined.

The burst length corresponds to 1824 bits, wherein all slots are used. The slots A, C, E and G are attenuated as indicated below.

| Slot A | Slot B | Slot C | Slot D | Slot E | Slot F | Slot G | Slot H |
|---|---|---|---|---|---|---|---|
| −3 dB | Full scale | −6 dB | Full scale | −9 dB | Full scale | −12 dB | Full scale |

Figure 8:
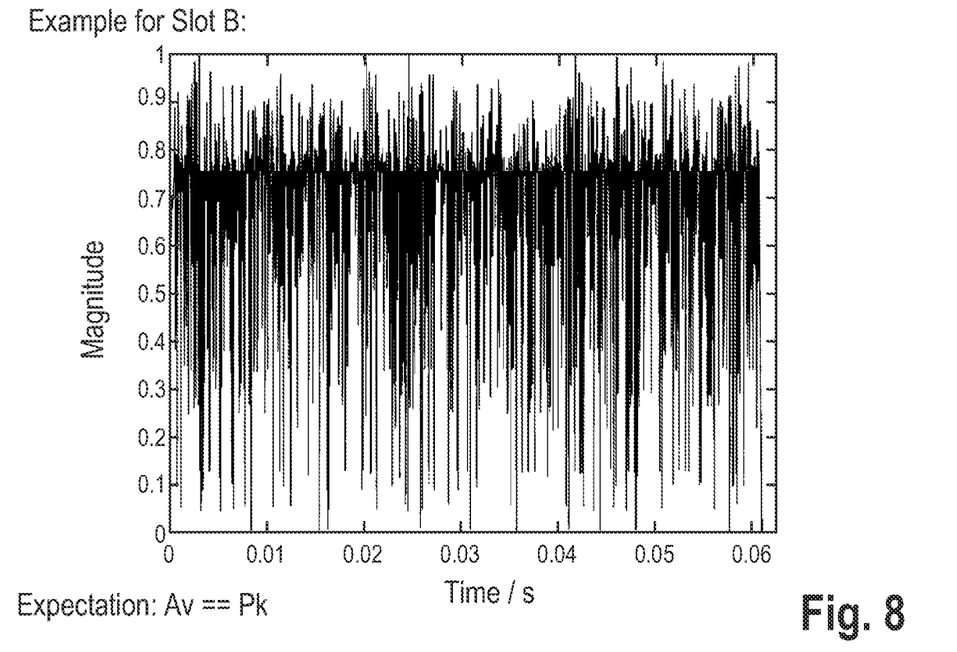

In FIG. 8, an example for slot B mentioned above is illustrated.

In this scenario, it is expected that the Av values equal the Pk values.

In a second GBAS scenario, ramp on bursts are described.

The burst length corresponds to 1824 bits, wherein all slots are used. The slots A, C, E and G have a ramp (signal level). This ramp starts with a power of 0.5 (50% of VDB steady-state power) and reaches 1 (100% of VDB steady-state power) with the last symbol.

| Slot A | Slot B | Slot C | Slot D | Slot E | Slot F | Slot G | Slot H |
|---|---|---|---|---|---|---|---|
| Ramp | Full scale | Ramp | Full scale | Ramp | Full scale | Ramp | Full scale |

Figure 9:
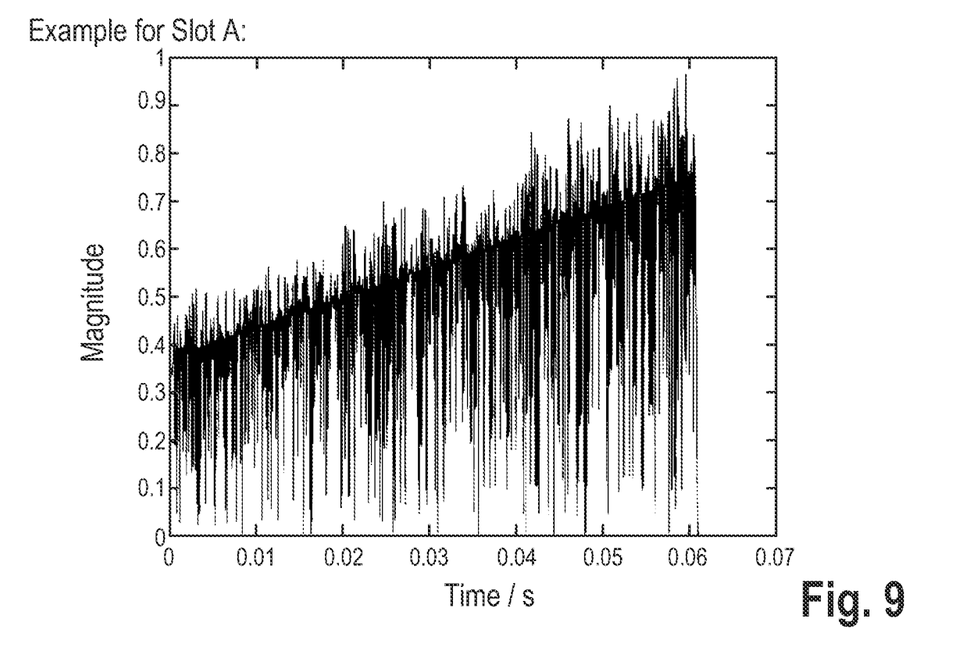

In FIG. 9, an example for slot A mentioned above is shown.

In this scenario, it is expected that the Av value corresponds to −6 dB. At the beginning of the burst, the ramp already starts during the training sequence, so this is a simplification for a rough estimation.

In contrast, the Pk value corresponds to 20*log 0.75=−2.5 dB, resulting in a difference in level indication of 3.5 dB between the respective values.

In a third GBAS scenario, cosine on burst is described.

The burst length corresponds to 1824 bits, wherein all slots are used. The slots B, D, F and H have a cosine signal (signal level). The respective cosine starts with a power of 1 (100% of VDB steady-state power) and reaches 0.5 (50% of VDB steady-state power) in the middle of the burst. After that, the level raises again to 1.

| Slot A | Slot B | Slot C | Slot D | Slot E | Slot F | Slot G | Slot H |
|---|---|---|---|---|---|---|---|
| Full scale | Cosine | Full scale | Cosine | Full scale | Cosine | Full scale | Cosine |

Figure 10:
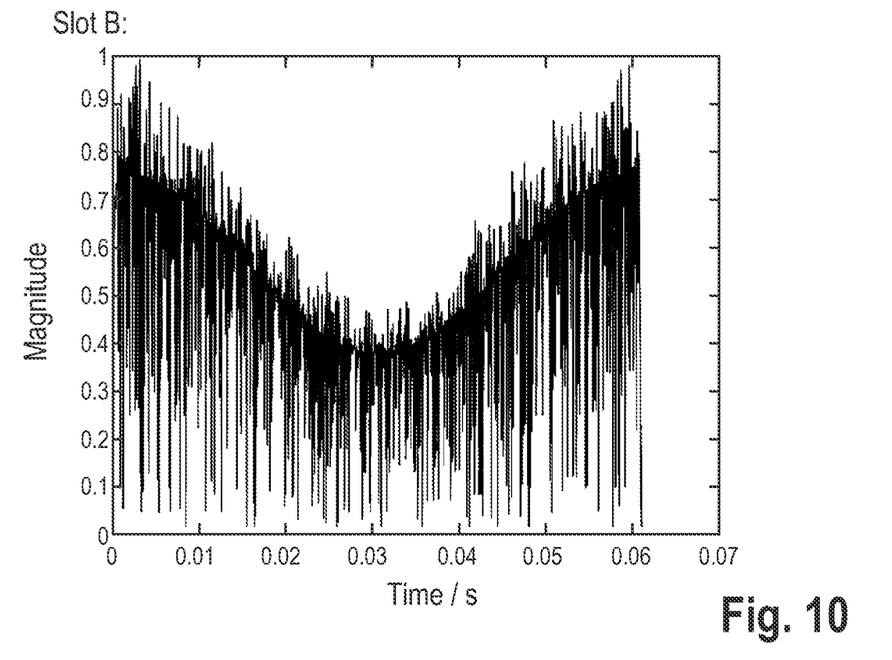

In FIG. 10, an example for slot B is illustrated accordingly.

It is expected for this scenario that the Av values corresponds to 0 dB (at the beginning of the burst), whereas the Pk values correspond to 20*log 0.75=−2.5 dB. Hence, a difference in level corresponds to 2.5 dB between the respective values.

In a fourth GBAS scenario, Rectangle on burst is described.

The burst length corresponds to 1824 bits, wherein all slots are used. The slots B, D, F and H show a rectangular signal (signal level from 0.5 to 1 in the middle of the burst).

| Slet A | Slot B | Slot C | Slot D | Slot E | Slot F | Slot G | Slot H |
|---|---|---|---|---|---|---|---|
| Full scale | Rect | Full scale | Rect | Ful scale | Rect | Full scale | Rect |

Figure 11:
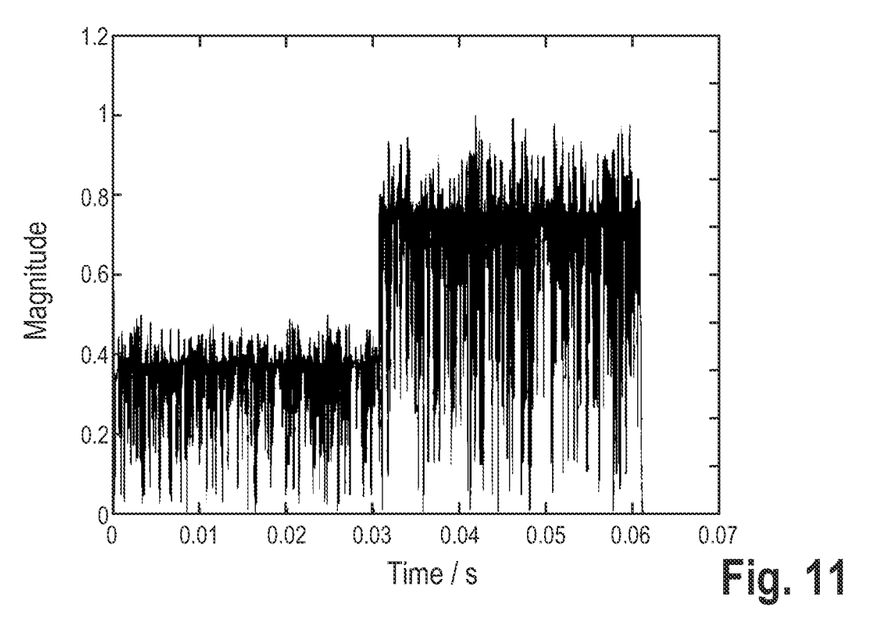

In FIG. 11, am example for Slot B is shown.

It is expected for this scenario that the Av values correspond to 0 dB (at the beginning of the burst), whereas the Pk values correspond to 20*log 0.75=−2.5 dB. Accordingly, a difference in level is 2.5 dB between the respective values.

Figure 12:
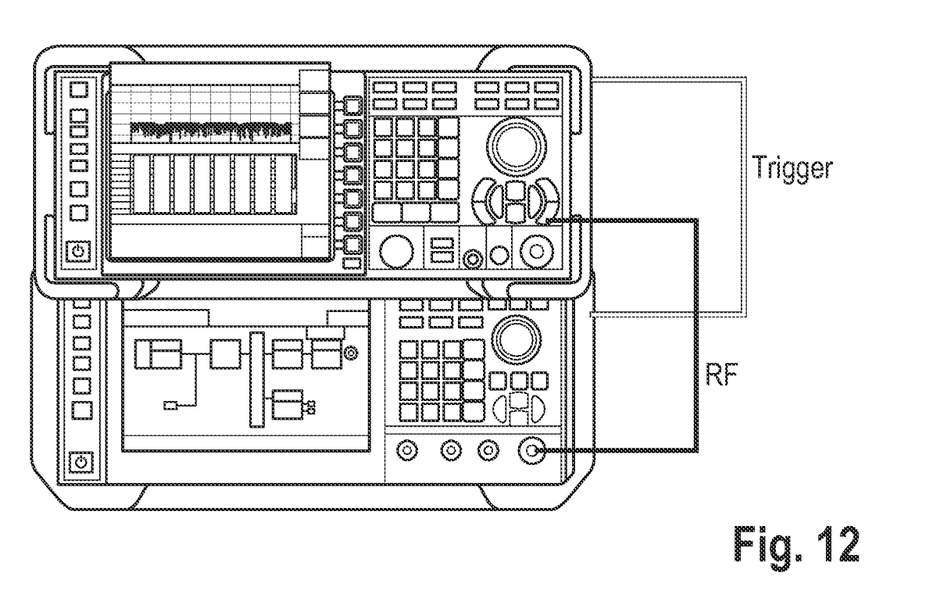

FIG. 12 shows the measurement setup used for the verification tests described above, wherein a vector signal generator, for example with synthetic test files, and a portable signal level and modulation analyzer are used.

Figure 13:
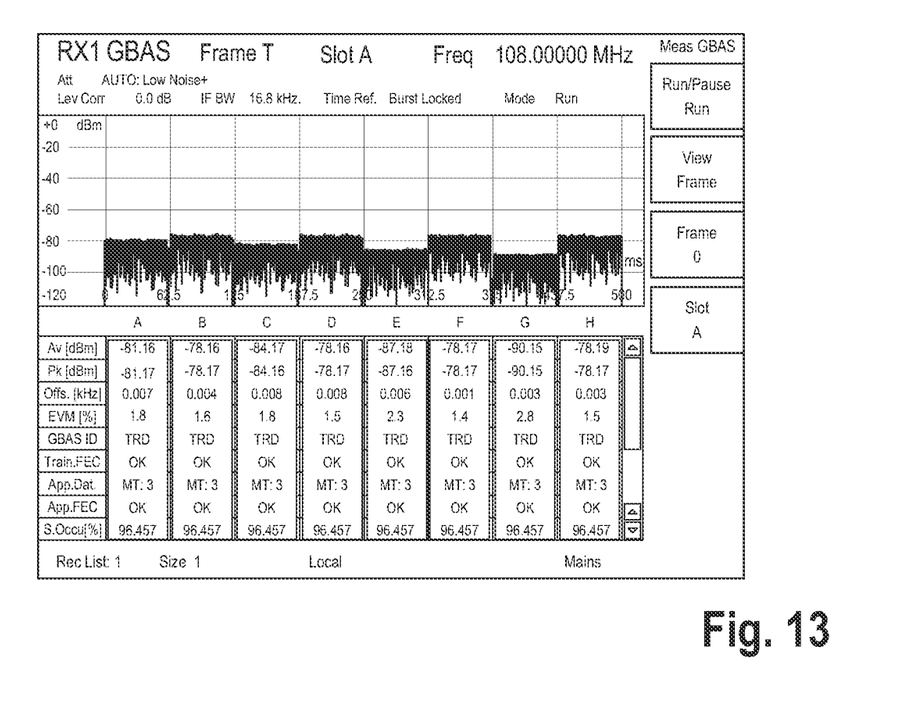

FIG. 13 shows a diagram of results obtained, namely for the first GBAS scenario "burst level differences between different slots". The results are also indicated by the table below.

| Measurements: | | | | | | | | |
|---|---|---|---|---|---|---|---|---|
| | Slot A | Slot B | Slot C | Slot D | Slot E | Slot F | Slot G | Slot H |
| Av [dBm] | −81.16 | −78.16 | −84.17 | −78.16 | −87.18 | −78.17 | −90.15 | −78.19 |
| Pk [dBm] | −81.17 | −78.17 | −84.16 | −78.17 | −87.16 | −78.17 | −90.15 | −78.17 |
| Delta [dB]: | 0.01 | 0.01 | 0.01 | 0.01 | 0.02 | 0.0 | 0.0 | 0.02 |

It becomes obvious that (substantially) identical Av level measurements and Pk level measurements in slots A-H. Accordingly, no level changes during a burst occur. Further, a 3 dB less level (Pk and Av) in slot A, a 6 dB less level (Pk and Av) in slot C, a 9 dB less level (Pk and Av) in slot E, and a 12 dB less level (Pk and Av) in slot G occur compared to slots B, D, F and H.

In this regard, reference is made to the expectations mentioned above for the first scenario.

Figure 14:
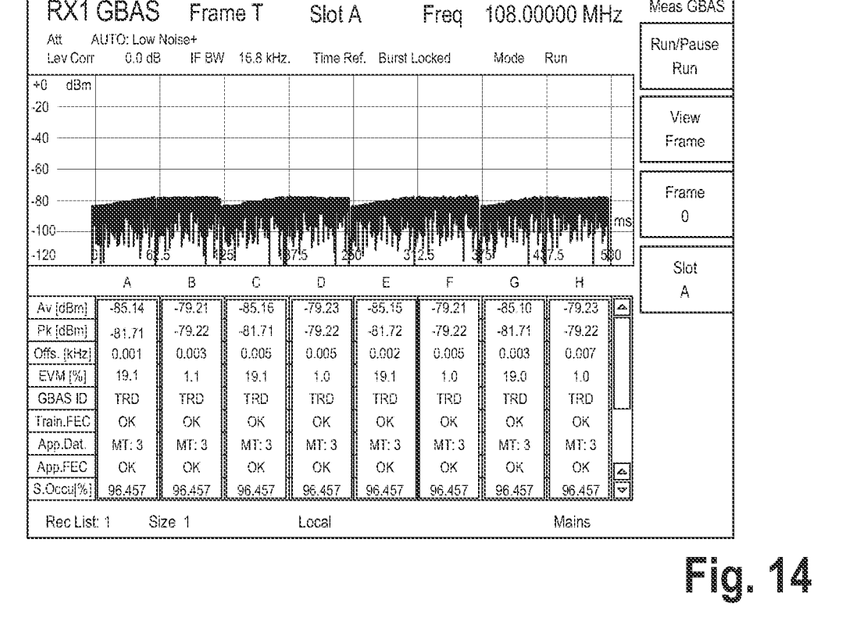

FIG. 14 shows a diagram of further results obtained, namely for the second GBAS scenario "ramp on burst". The respective results are also indicated by the table below.

| | Measurements: | | | | | | | |
|---|---|---|---|---|---|---|---|---|
| | Slot A | Slot B | Slot C | Slot D | Slot E | Slot F | Slot G | Slot H |
| Av [dBm] | −85.14 | −79.21 | −85.16 | −79.23 | −85.15 | −79.21 | −85.10 | −79.23 |
| Pk [dBm] | −81.71 | −79.22 | −81.71 | −79.22 | −81.72 | −79.22 | −81.71 | −79.22 |
| Delta [dB]: | 3.43 | 0.1 | 3.45 | 0.1 | 3.43 | 0.1 | 3.39 | 0.1 |

It becomes obvious that (substantially) identical Av level measurements and Pk level measurements in slots B, D, F, H (no changes of the bust power) take place.

Moreover, it is shown that a 6 dB less level in the Av level measurements between slots A, C, E, G occur compared to the Av level measurements on slots B, D, F, H.

In some embodiments, the level at the start of the respective burst is 6 dB lower, wherein the respective measurement over the training sequence shows this level at the start of the burst, whereas the Av level measurements on slots B, D, F, H correspond to a constant level.

Moreover, it is shown that the respective level is 3.5 dB lower for the Av level measurements in slots A, C, E, G compared to the Pk level measurements in slots A, C, E, G.

In this regard, reference is made to the expectations mentioned above for the second scenario.

The respective measured level difference is a bit less (roughly 0.1 dB) than the expected one (3.5 dB) because the ramp already starts during the trainings sequence.

Figure 15:
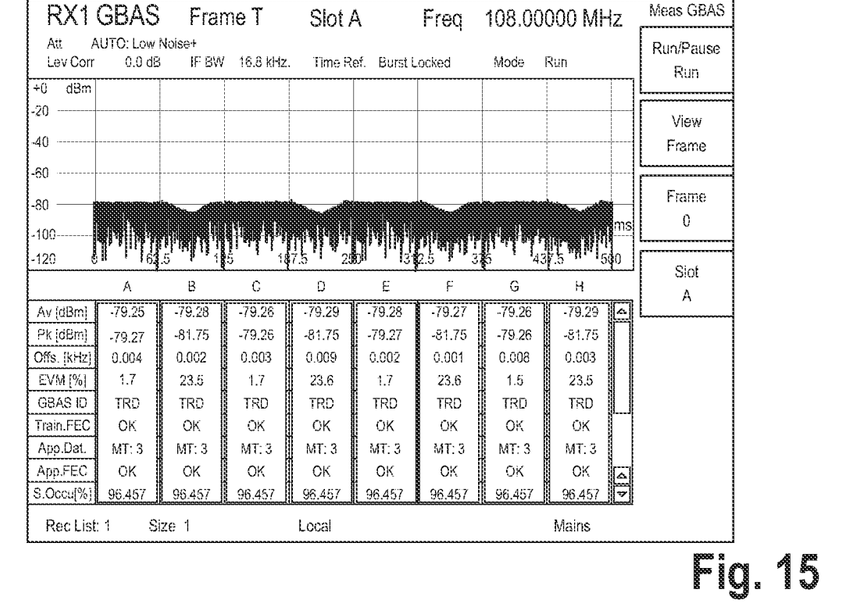

FIG. 15 shows a diagram of further results obtained, namely for the third GBAS scenario "cosine on burst". The respective results are also indicated by the table below.

| | Measurements: | | | | | | | |
|---|---|---|---|---|---|---|---|---|
| | Slot A | Slot B | Slot C | Slot D | Slot E | Slot F | Slot G | Slot H |
| Av [dBm] | −79.25 | −79.28 | −79.26 | −79.29 | −79.28 | −79.27 | −79.26 | −79.29 |
| Pk [dBm] | −79.27 | −81.75 | −79.26 | −81.75 | −79.27 | −81.75 | −79.26 | −81.75 |
| Delta [dB]: | 0.02 | 2.47 | 0.0 | 2.46 | 0.01 | 2.48 | 0.0 | 2.46 |

It becomes obvious that (substantially) identical Av level measurements in all slots (same burst levels on all slots in trainings sequence of bursts in slots B, D, F, H) occur. Moreover, it is shown that a 2.5 dB less level of the Pk level measurements in slots B, D, F, H than the Av level measurements in slots B, D, F, H occur.

In this regard, reference is made to the expectations mentioned above for the third scenario.

Figure 16:
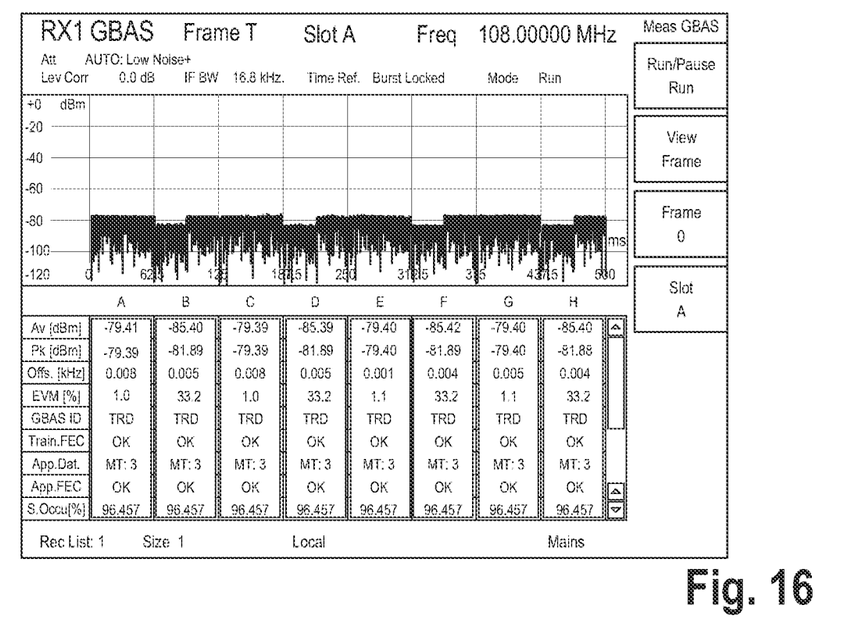

FIG. 16 shows a diagram of further results obtained, namely for the fourth GBAS scenario "rectangle on burst". The respective results are also indicated by the table below.

| | Measurements: | | | | | | | |
|---|---|---|---|---|---|---|---|---|
| | Slot A | Slot B | Slot C | Slot D | Slot E | Slot F | Slot G | Slot H |
| Av [dBm] | −79.41 | −85.4 | −79.39 | −85.39 | −79.4 | −85.42 | −79.4 | −85.4 |
| Pk [dBm] | −79.39 | −81.89 | −79.39 | −81.89 | −79.4 | −81.89 | −79.4 | −81.88 |
| Delta [dB]: | 0.02 | 3.51 | 0.0 | 3.5 | 0.0 | 3.53 | 0.0 | 3.52 |

It becomes obvious that (substantially) identical Av level measurements and Pk level measurements in slots A, C, E, G (no changes on the bust levels) occur.

Moreover, it is shown that a 6 dB less level in the Av level measurements between slots A, C, E, G and B, D, F, H occurs. In some embodiments, the first half of the slots have 6 dB less level. Hence, the measurement over the training sequence shows this level.

In addition, a 3.5 dB less level of the Av level measurements in slots B, D, F, H than the Pk level measurements in slots B, D, F, H occur.

In this regard, reference is made to the expectations mentioned above for the fourth scenario.

Therefore, the verification described above may be summarized as follows.

The level measurements in the lab meet the expectations concerning level values. A level measurement over the complete burst helps to avoid big level errors due fluctuations of the GBAS power (e.g. reduce influence of receiving antenna diagram—notches) and as the result is averaged over a complete burst leads to more stable results. Moreover, a GBAS power measurement only at the symbol times (8DPSK) avoids any dependency of the level measurement of the content of the GBAS message.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the methodologies and technologies described herein can be implemented by special purpose hardware-based computer systems or circuits, etc., or combinations of special purpose hardware and computer instructions.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follow:

1. A method of analyzing a ground-based augmentation system (GBAS) signal, the method comprising:
    transmitting a GBAS signal that comprises at least one GBAS message burst, wherein the GBAS signal comprises several frames, wherein each frame is assigned to eight time slots, and wherein the at least one GBAS message burst is transmitted within one of the eight time slots;
    receiving and decoding the GBAS signal with the GBAS message burst, wherein the GBAS message burst is a partly filled burst; and
    performing a power measurement at all symbol times of the GBAS message burst, wherein the power measurement is performed over the entire length of the GBAS message burst such that all occurring symbol times within the GBAS message burst are taken into consideration for performing the power measurement, thereby ensuring that all occurring deviations or fluctuations in the power during the GBAS message burst are considered, and wherein the power measurement is performed only at the symbol times;
    wherein the GBAS message burst comprises less than 633 symbols and wherein less than 633 symbols are taken into account for the power measurement since the power measurement is done only at the symbol times of the complete GBAS message burst.

2. The method according to claim 1, wherein the GBAS message burst encompasses a training sequence and application data following the training sequence in time.

3. The method according to claim 1, wherein the GBAS message burst is assigned to a Very High Frequency Data Broadcast signal.

4. A test system for testing a ground-based augmentation system (GBAS), the test system comprising a GBAS test transmitter, a GBAS test receiver and a control and/or evaluation circuit, wherein the GBAS test transmitter is configured to transmit a GBAS signal that comprises at least one GBAS message burst, wherein the GBAS signal comprises several frames wherein each frame is assigned to eight time slots, and wherein the at least one GBAS message burst is transmitted within one of the eight time slots, wherein the GBAS test receiver is configured to receive and decode the GBAS signal with the GBAS message burst, wherein the GBAS message burst is a partly filled burst, wherein the control and/or evaluation circuit is configured to perform a power measurement only at all symbol times of the GBAS message burst, and wherein the power measurement is performed over the entire length of the GBAS message burst such that all occurring symbol times within the GBAS message burst are taken into consideration for performing the power measurement, thereby ensuring that any occurring deviations or fluctuations in the power during the GBAS message burst are taken in consideration, wherein the GBAS message burst comprises less than 633 symbols and wherein less than 633 symbols are taken into account for the power measurement since the power measurement is done only at the symbol times of the complete GBAS message burst.

5. The test system according to claim 4, wherein the control and/or evaluation circuit and the GBAS test receiver are integrated in a testing device.

6. The test system according to claim 5, wherein the testing device is a handheld device or a portable device.

7. The test system according to claim 6, wherein the testing device is a battery-powered testing device.

8. The test system according to claim 4, wherein the GBAS test transmitter is established by a GBAS transmitter of the ground-based augmentation system to be tested.

9. The test system according to claim 4, wherein the GBAS test receiver is established by a GBAS receiver of an airplane of the ground-based augmentation system to be tested.

10. A method of analyzing a ground-based augmentation system (GBAS) signal, the method comprising:
transmitting a GBAS signal that includes at least one GBAS message burst;
receiving and decoding the GBAS signal with the GBAS message burst, wherein the GBAS message burst is a partly filled burst comprising less than 633 symbols; and
performing a power measurement at symbol times of the GBAS message burst, wherein the power measurement is performed only at all symbol times of the at least one GBAS message burst, wherein less than 633 symbols are taken into account since the power measurement is done only at the symbol times of the complete GBAS message burst,
wherein the power measurement is performed over the entire length of the GBAS message burst such that all occurring symbol times within the GBAS message burst are taken into consideration for performing the power measurement, thereby ensuring that any occurring deviations or fluctuations in the power during the GBAS message burst are taken in consideration.

* * * * *